Aug. 21, 1962     G. J. GIEL     3,050,718
PHYSICAL DISPLACEMENT REGISTER
Filed March 12, 1957     2 Sheets-Sheet 1

INVENTOR.
GEORGE J. GIEL
BY Byard G. Nilsson

ATTORNEY

Aug. 21, 1962  G. J. GIEL  3,050,718
PHYSICAL DISPLACEMENT REGISTER
Filed March 12, 1957  2 Sheets-Sheet 2

INVENTOR.
GEORGE J. GIEL
BY
ATTORNEY

United States Patent Office 3,050,718
Patented Aug. 21, 1962

3,050,718
PHYSICAL DISPLACEMENT REGISTER
George J. Giel, Redondo Beach, Calif., assignor to The Bendix Corporation, a corporation of Delaware
Filed Mar. 12, 1957, Ser. No. 645,480
4 Claims. (Cl. 340—203)

This invention relates to physical-displacement registration systems, and more particularly to such a system for forming signals which manifest the physical displacement of a shaft or other member relative to a predetermined location.

Data processing and automation systems often require apparatus for sensing and indicating the physical displacement of some member from a reference location or position. With the increased use of digital equipment in systems of this type, a growing need exists for apparatus which will form digital electrical signals to indicate the position of a member. One prior arrangement for performing this function includes a segmented disk attached to the movable member. Several stationary electrical elements as photo electric cells or brush contacts then sense the different segments in accordance with the position of the disk, and thereby form electrical signals indicative of the displacement. In the use of such disks, or of similarly constructed cylinders, it is a requirement that the segmented areas be very accurately formed and the alignment of the stationary electrical elements be precisely maintained to prevent misregistration.

Systems employing segmented disks or cylinders to sense displacement are normally limited in operation to a single revolution of the disk or cylinder, unless additional units are provided to maintain a count of the number of revolutions of displacement from the reference location. This limitation is often burdensome.

According to the present invention, in its more general form, a variable resistance is coupled to be controlled by a shaft or other member which is to be displaced. As displacement occurs, the value of the variable resistance will be changed, and a proportionally changing voltage is formed as a result. The magnitude of such a voltage is thus indicative of the physical displacement of the movable member. The increments in this varying voltage are differentiated to form electrical pulses which indicate incremental variations of physical displacement. These pulses may be either positive or negative to thereby indicate positive or negative increments of displacement. The electrical pulses are then applied to a register which registers the physical displacement of the movable member. Additionally, when the system is utilized to register cyclic displacement, as the displacement of a rotatable shaft, means may be provided for sensing the completion of a full revolution from the reference position, so that the system may operate continuously through an unlimited number of revolutions.

It is an object of this invention to provide an improved physical displacement registration system.

Another object of this invention is to provide improved means for forming electrical signals indicative of the physical displacement of a member from a reference position.

Still another object of this invention is to provide a physical displacement register of more economical construction.

A further object of this invention is to provide a physical displacement register which operates in an improved fashion to register cyclic displacement through a plurality of cycles.

A still further object of this invention is to provide a physical displacement register wherein compliance with exacting tolerances is not totally necessary.

Other and incidental objects of this invention will be apparent to those skilled in the art from reading the following specification and on inspection of the accompanying drawing in which.

Figure 1:
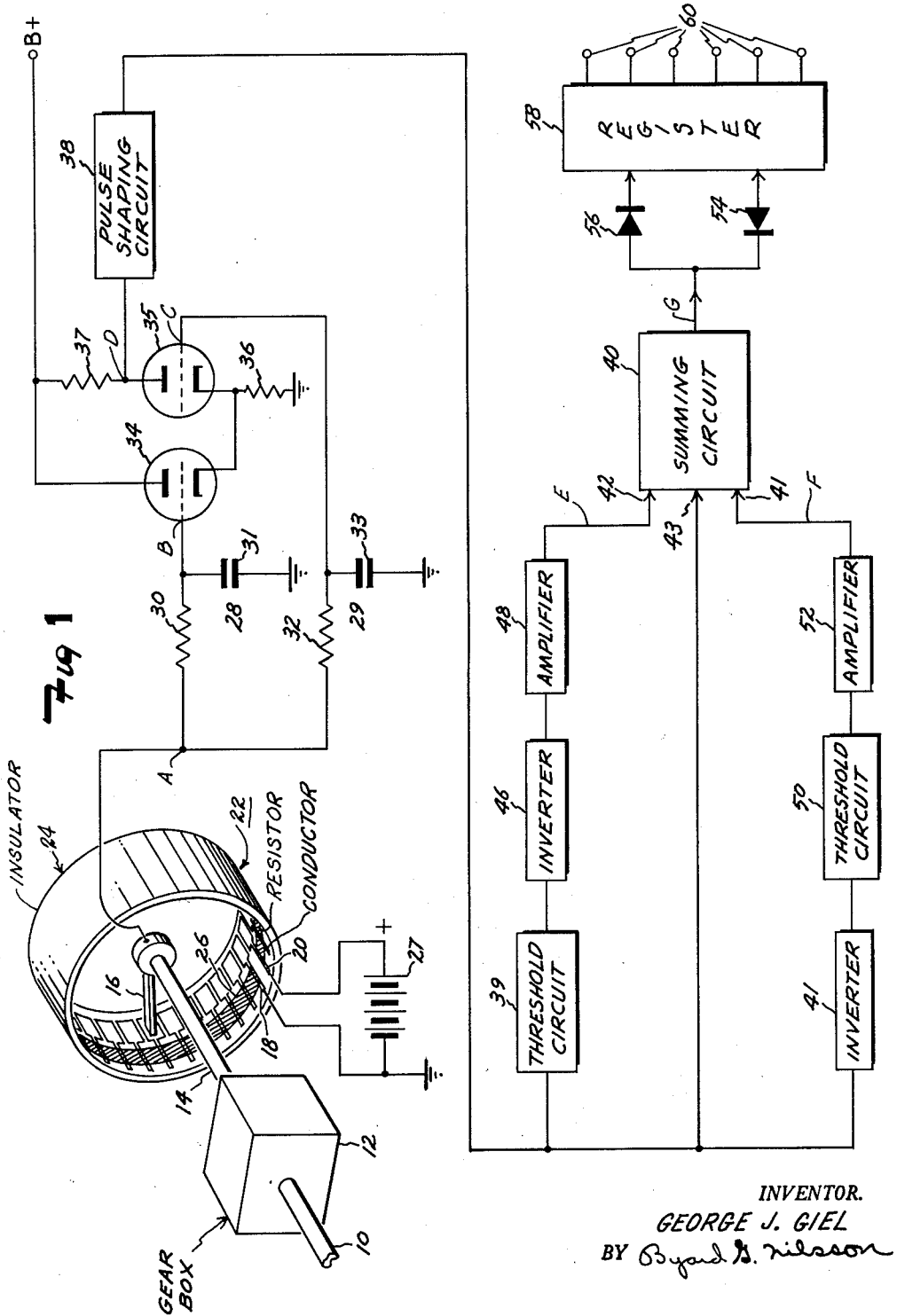
FIGURE 1 is a perspective and diagrammatic representation of a system constructed in accordance with the principles of the invention.

Referring now to the drawing and specifically to FIGURE 1, there is shown a shaft 10 adapted to be connected to a movable member, the rotational displacement of which is to be sensed, registered, and indicated. The shaft 10 is connected to a gear box 12, which may be used to alter the relative movement between the shaft 10 and a shaft 14. The end of the shaft 14, which is remote from the gear box 12, is connected to a brush 16, which contacts conductors, e.g. 18 and 20 of a resistance element 22. The shaft 14 is formed of insulating material and therefore electrically isolates the brush 16 from the gear box 12.

The resistance member 22 may be formed by placing the conductors, as 18 and 20 upon a base member 24 formed of some insulating material, as plastic resin or resin impregnated fiber. Techniques of printed circuitry, or etched circuitry may be employed to form the conductors, e.g. 20, so that they have two different widths. The conductors are so placed that the brush 16 will dwell upon the wide portion of the conductors.

A strip 26 of resistance material (shown shaded) is placed upon the base member 24 so as to form resistive current paths between the narrow portions of each of the adjacent conductors, except between the conductors 18 and 20. The resistance material used in the strip may comprise various available resistance paint materials as a product commercially known as "aquadag." It may therefore be seen that the resistance element comprises a potentiometer formed of individual conductors interconnected by resistance material.

The conductors 18 and 20 are connected to the terminals of a battery 27 and the conductor 18 is also connected to ground. The brush 16 is connected from the resistance element 22 to two series resistance-capacitance circuits 28 and 29 which are in turn connected to ground. The resistance-capacitance circuit 28 includes a resistor 30 and a capacitor 31, while the circuit 29 includes a resistor 32 and a capacitor 33. The circuits 28 and 29 have different time constants and thus effect different amounts of time delay in the signals received from the brush 16.

The junction point between the resistor 30 and the capacitor 31 is connected to the grid of a tube 34, and the junction point between the resistor 32 and the capacitor 33 is connected to the grid of a tube 35. The plate of the tube 34 is energized by a direct connection to a source of direct current. The cathodes of the tubes 34 and 35 are both connected through a resistor 36, to ground. The plate of the tube 35 is connected through a resistor 37 to a source of direct current, and also to a pulse shaping circuit 38. The function of the tubes 34 and 35 with their associated circuitry is to differentiate voltage increments received by the brush 16, to thereby form pulses to be applied to the pulse shaping circuit 38.

The pulse shaping circuit 38 is connected to a threshold circuit 39, a summing circuit 40, and an inverter circuit 41. The threshold circuit 39 may consist for example, of simply a threshold biased amplifier, or the more elaborate well-known Schmitt trigger circuit. The function of this circuit is to pass only electrical pulses which exceed a predetermined amplitude.

The summing circuit 40 serves to combine all the signals applied at its input terminals 42, 43, and 44, to form a composite signal consisting of the summation of the received signals. A resistive adding circuit may be employed to perform this function.

The inverter circuit 41 serves to invert received signals, or reverse the phase of such signals. This circuit may consist of simply a plate-follower amplifier.

The threshold circuit 39 is connected to an inverter circuit 46 which is in turn connected through an amplifier circuit 48 to the input 42 of the summing circuit 40. The inverter circuit 46 may take the same form as the inverter circuit 41.

The inverter circuit 41 is connected to a threshold circuit 50 which is in turn connected through an amplifier 52 to the input 44 of the summing circuit 40. The thereshold circuit 50 may take a form similar to the threshold circuit 39.

The summing circuit 40 has its output connected through a pair of oppositely-poled diodes 54 and 56 to the input terminals of a register 58. The register 58 thus receives positive pulses through the diode 56, and negative pulses through the diode 54. The register 58 may comprise various add-subtract pulse-operated registers which serve to accumulate positive pulses as positive units, and negative pulses as negative units. One such register or counter is shown and described in the United States Patent 2,735,005, issued February 14, 1956, to F. G. Steele. The individual stages of such a register may then be provided with the terminals 60 for providing parallel digital binary code signals indicative of the content of the register.

Figure 2:
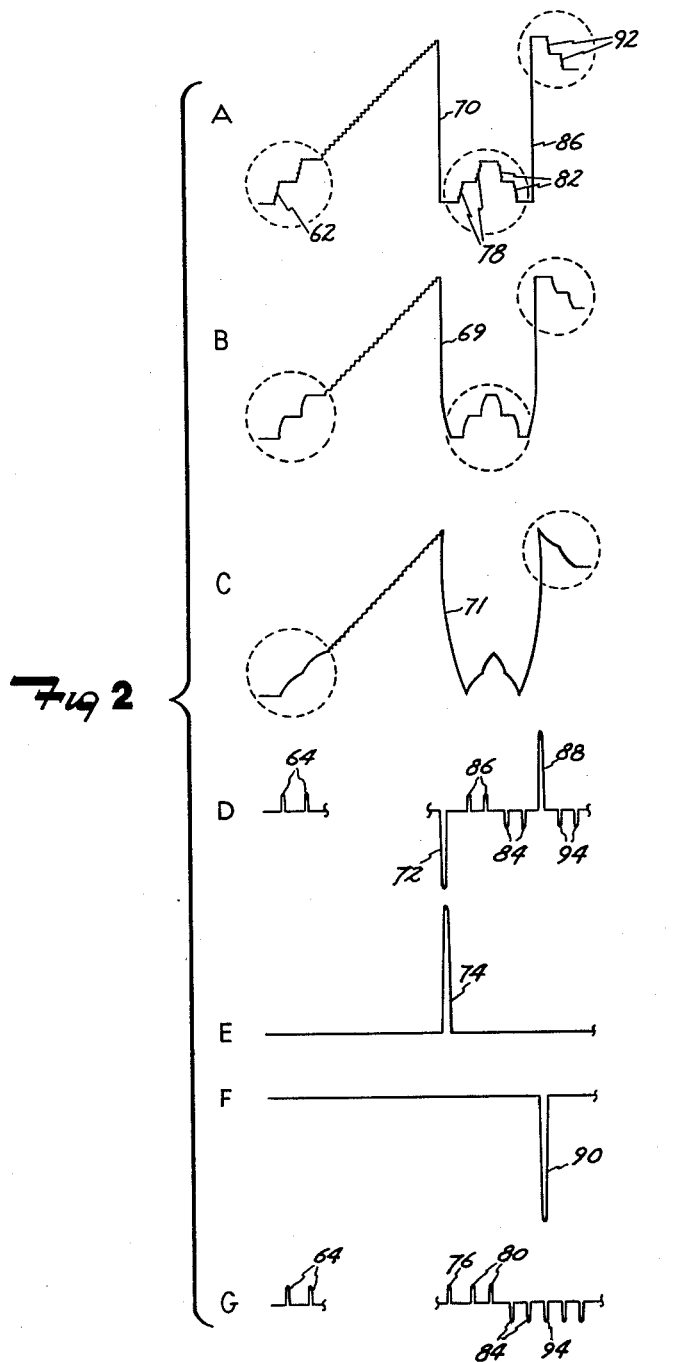
FIGURE 2 shows waveforms of various electrical signals which may be formed in the system of FIGURE 1.

Reference will now be had to the curves A through G of FIGURE 2 in conjunction with the system of FIGURE 1, for an explanation of the method of operation of the described embodiment. The curve A represents a signal received by the brush 16. Curve B shows this same signal as it appears at the junction point between the resistor 30 and the capacitor 31, i.e. at the grid of the tube 35. The curve C shows the signal from the brush 16 as it appears on the grid of the tube 35. Curve D indicates the signal applied to the pulse shaper circuit 38. The curve E shows the output signal from the amplifier 48 while curve F shows the output signal of the amplifier 52. Curve G shows the signal emerging from the summing circuit 36.

To consider the operation of the system of FIGURE 1, assume initially that the shaft 10 is placed in a reference position or location which coincides to zero displacement. With the shaft 14 in this position, the brush 16 will dwell upon the conductor 18. Prior to operation the gear box 12 may be varied to alter the relative displacements between the shafts 10 and 14, depending upon the application of the system and the anticipated rate of rotation of the shaft 10. That is, for example if the rotation of the shaft 10 is to be relatively fast then the gear box 12 may be operated to reduce the rate of rotation of the shaft 14.

The battery 27 causes a current to pass through the resistance strip of the resistance element 22. Therefore voltages appear at each of the conductors of the element 22, e.g. conductors 18 and 20. The voltage on each conductor will vary from the voltage on the adjacent conductors by a voltage differential equal to the voltage drop across a portion of the strip 26 which separates the conductors. That is, the conductors e.g. 20, each contact the resistance strip at a different point, and as the voltage drop across the length of the resistance strip is essentially uniform each of the conductors will be maintained at a discrete level of voltage.

At the time when the brush 16 dwells upon the conductor 18, a voltage of zero or ground potential is received by the brush, thus indicating zero displacement of the shaft 14, and thus the shaft 10. Now as the shafts 10 and 14 revolve, the brush 16 is moved into contact with conductors at higher levels of voltage, and a stepped waveform voltage is received by the brush 16. The electrical system functions to form a pulse from each step of this voltage, and utilizes such pulses to operate the register 58 to indicate displacement of the shaft 10.

As the brush 16 moves from the conductor 18 in a clockwise fashion to the next conductor, it contacts a source of higher voltage. The change in voltage received by the brush 16 is shown by the first step 62 in the curve A of FIGURE 2. The circled portions of the curves of FIGURE 2 indicate enlarged sections of the curves which are analyzed in detail hereinafter.

Each of the steps in the curve A indicates a movement of the brush 16 into contact with a conductor positioned further about of the resistance member 22 in a clockwise direction. With the application of this stepped voltage wave to the circuits 28 and 29 and the tubes 34 and 35 these elements function to form pulses as shown in curve D in the manner described below.

Considering the initial enlarged portion of the curve A, it may be seen that this portion of the curve shows the brush 16 being moved over three of the conductors, e.g. 18, of the resistance element 22. The dwell time on each conductor essentially coincides to a plateau of the curve A. The stepped voltage wave as shown in curve A is applied from the brush 16 simultaneously to the resistance-capacitive circuits 28 and 29. These circuits are formed so that the time constants are different. That is, the capacitor 31 is charged at a faster rate than the capacitor 33. The voltages developed on the capacitors 31 and 33 are shown in the curves B and C respectively. The tubes 34 and 35 function to subtractively combine these voltages of curves B and C, to form a voltage as shown by the curve D. The voltage of the curve B is applied to the grid of the tube 34, thereby causing the tube current to vary in a similar fashion and to form a similar voltage across the resistor 36 in the cathode circuit of this tube. The cathodes of the tubes 34 and 35 are coupled together, therefore, this voltage also appears at the cathode of the tube 36. During the same interval that the cathode of the tube 35 receives the voltage of curve B, the voltage developed across the capacitor 33 (as shown in curve C) is applied to the grid of the tube 35. The result of these voltages as shown by curves B and C, being respectively applied to the cathode and grid of the tube 35 is to cause the current through the tube to be differently effected by each of the voltages so that a voltage, equivalent to the difference between the two voltages, appears at the plate of the tube 35. This voltage comprises pulses 64 as shown in the curve D.

The pulses 64 of curve D are applied to the input 43 of the summing circuit 40. These pulses 64 pass through the summing circuit 40 (as shown by the curve G) and are then passed through the diode 56 to cause the register 58 to advance two counts indicating that the shaft 14 has caused the brush 16 to move from the home conductor 18 over the next two conductors. In this manner an indication is made of the displacement of the shaft 10. It is to be noted that the pulses 64 are not of sufficient amplitude to pass through the threshold circuits 46 and 38 and therefore have no effect on the inputs 42 and 41 of the summing circuit 40.

Assume now, for example, that the shaft 10 continues to revolve, causing the register 58 to register and manifest progressively higher values until the brush 16 dwells upon the conductor 20. As the brush 16 is moved away from the conductor 20 to dwell upon the conductor 18, the voltage received will drop back to zero, or ground potential, as shown by the negative-going step 70 in the curve A.

If the system is to function through several revolutions of the shaft 14, this step 70 must be recorded as a positive increment of displacement by the shaft 14, since it represents a clockwise increment of rotation by the shaft 14.

The step 70, as shown in curve A is passed to the resistance-capacitance circuits 28 and 29 to charge the capacitors 31 and 32 at different rates and form steps 69 and 71. As the steps 69 and 71 of curves B and C indicate, the capacitor 31 charges at a faster rate than the capacitor 33. A large negative pulse 72 shown in curve D therefore appears at the plate of the tube 35 representing the subtractive combination of the steps 69 and 71 by the tubes 34 and 35 which may be considered to function as differential amplifier.

The negative pulse 72 appearing at the plate of the tube 35 is applied simultaneously to the terminal 43 of summing circuit 40, to the threshold circuit 39, and to the inverter circuit 41. The negative pulse 72 has no effect on the threshold circuit 39 because this circuit only passes pulses above a predetermined positive level. On application of the negative pulse 72 to the inverter circuit 41 the pulse is formed into a positive pulse 74 as shown in the curve D. The pulse 74 is then passed by the threshold circuit 50 because it is above the threshold amplitude, and is applied to the amplifier 52. The amplifier 52 amplifies the pulse 74 to an amplitude greater than the pulse 72 and applies it to the input of the summing circuit 40. The summing circuit 40 thus receives the negative pulse 72 and the positive pulse 74 in time coincides at its input terminals 43 and 44. The positive pulse 74, however, has a greater amplitude than the negative pulse 72, therefore, when these pulses are additively combined, the result is a positive pulse 76 (as shown in curve F), having an amplitude coinciding to the amplitude difference between the pulses 72 and 74. This positive pulse 76 is applied from the summing circuit 40 to the register 58 via the diode 56, and serves to step the register 58, so as to indicate a value of one step greater positive displacement. It may therefore be seen that a complete revolution of the shaft 14 has occurred and is registered by the register 58, and that digital signals are provided at the terminals 60 which manifest the shaft displacement.

As the shaft 14 continues to move in a clockwise direction positive-going voltage steps 78 will again result at the brush 16, as shown in the curve A. These steps will be differentiated by the combined operation of the circuits 28 and 29 and the tubes 34 and 35 (as previously explained) to form pulses 86. The pulses 86 are applied to the register 58, via the summing circuit 36, and the diode 56, to further increase the value registered in the register 58 to thereby indicate further positive displacement of the shaft 14. Again these pulses are not of sufficient amplitude to pass the threshold circuits 39 or 50 and therefore have no effect on these circuits.

Assume now, that after the pulses 86 have been registered, the direction of rotation of the shaft 10 is reversed, thereby reversing the movement of the shaft 14 so that both shafts now move in a counter-clockwise direction. As the brush 16 is moved in a counter clockwise direction it receives progressively lower voltages in discrete steps 82 as shown in curve A. These voltage steps 82 are differentiated as previously explained, by the circuitry including the tubes 34 and 35 to form negative pulses 84 at the plate of the tube 35. The negative pulses 84 are applied simultaneously to the threshold circuit 39, the summing circuit 40, and through the inverter circuit 41 to the threshold circuit 50. These pulses 84 are not of sufficient amplitude to pass through either of the threshold circuits 39 or 50, and therefore are of no effect on these circuits. However, the pulses 84 do pass through the summing circuit 40 and the diode 54 to be applied to the register 58 and effect negative incremental counts within the register.

As the shaft 14 continues to move in a counter-clockwise manner, it will move the brush 16 from the conductor 18 into contact with the conductor 20. The voltage received by the brush will then change from ground potential to the highest possible voltage level, as shown by the step 86 in the curve A. This step 86 after passing circuits 28 and 29 will appear as shown in curves B and C respectively.

The differential combination of these curves by the tubes 34 and 35 forms this step into a positive pulse 88. The pulse 88 is inverted by the inverter 41 into a negative pulse which will have no effect upon the threshold circuit 50. The positive pulse 88, however, when applied directly to the threshold circuit 39 is sufficient to pass this circuit and be inverted by the inverter circuit 46 to form a negative-going pulse 90 as shown in curve F. The pulse 90 is then amplified to a greater amplitude than the pulse 88 by the amplifier 48, and therefore when these two pulses are simultaneously applied to the summing circuit 36 via the input terminals 42 and 43, they result in a negative pulse 94, which has an amplitude approximating the difference in amplitude between the pulses 88 and 90. This negative pulse 94 is applied to the register 58 through the diode 54 to cause a negative count to be made by the register thereby accounting for the assumed counter-clockwise movement of the brush from the conductor 18 to the conductor 20.

If the shaft 14 continues to move in a counter clockwise manner, negative-going voltage steps 92, are formed in the signal received by the brush 16 as shown in curve A. These steps 92 will be differentiated as previously explained to form negative pulses 94 which will be applied to the register 58 through the pulse shaping network 38, the summing circuit 40 and the diode 54. The register 58 will then record these pulses as negative (counter-clockwise) increment of displacement. It is to be noted that these pulses 94 will not be of sufficient amplitude to pass the threshold circuits 39 or 50 and therefore will be received by the summing circuit 40 only upon the terminal 43.

From the foregoing, it may be seen that this invention may be coupled to various shafts to measure the rotational displacement of such shafts from a reference point through several cycles of rotation.

It is to be noted that as the brush 16 moves, certain spurious signals result from the brush bouncing, and from arcing between the brush 16 and the conductors, e.g. 20. However, the components of the system may be selected such that these signals are attenuated to such an extent as to be of no consequence. Forming the contact of the brush 16 of low work function resistance material, and forming the brush 16 to have a particular natural frequency of vibration can substantially eliminate spurious signals. Filtering means may also be connected to the brush 16 to selectively eliminate recurring spurious signals.

The system of this invention may also be applied to sense, register, and manifest linear displacement as well as rotational displacement. In such an application, the brush 16 may be coupled to a mechanical system for converting linear movement to rotational movement, or alternatively, the resistance member 22 may be formed in a single plane such that the brush 16 moves in a linear fashion to contact the different conductors of the resistance member 22. It is to be noted that the resistance member 22 may be formed in various manners, and may comprise simply a wire wound potentiometer, wherein a movable element, as the brush 16 progressively contacts points of a higher potential of the potentiometer.

Although for the purpose of explaining the invention, particular embodiments thereof have been shown and described, obvious modifications will occur to a person skilled in the art and this invention is not to be limited to the details of the described embodiment.

What is claimed is:

1. A system for manifesting the angular displacement of a rotatively-mounted shaft, comprising: a cyclic bi-directional step potentiometer connected to said rotatively-mounted shaft, for providing a single output signal having a range of discrete levels dependent on the angular position of said rotatively-mounted shaft; a differentiator circuit connected to receive said signal from said potentiometer, for providing output pulses upon the occurrence of level changes in said signal from said potentiometer, the sense of said output pulses being indicative of the direction of a level change in said signal; and a two-way digital register connected to receive said pulses from said differentiator circuit to register pulses of one sense as increments and pulses of the other sense as decrements.

2. Apparatus according to claim 1 wherein said cyclic step potentiometer comprises: an annular base member for providing a rigid surface; a plurality of conductors each wide and narrow sections exposed on said rigid surface; a strip of resistance material positioned on said rigid surface and extending partially around said base member to contact said narrow sections of said conductors; and brush means rotatively mounted to contact said wide sections of said conductors.

3. Apparatus according to claim 1 wherein said differentiator circuit comprises: a first circuit responsive to input signals at a first time constant; a second circuit responsive to input signals at a second time constant; means connecting said first and second circuits to receive the output signal from said potentiometer; and means for combining the response signals of said first and second circuits to provide pulses.

4. A system for manifesting the angular displacement of a rotatively-mounted shaft, comprising: a cyclic bi-directional step potentiometer connected to said rotatively-mounted shaft, for providing a single output signal having a range of discrete levels dependent on the angular position of said rotatively-mounted shaft; a differentiator circuit connected to receive said signal from said potentiometer, for providing output pulses upon the occurrence of level changes in said signal from said potentiometer, the sense of said output pulses being indicative of the direction of a level change in said signal; a threshold circuit connected to receive said pulses from said differentiator circuit for passing only pulses of a predetermined amplitude, which amplitude substantially coincides to said range of discrete levels of said potentiometer output signal; an inverter circuit connected to receive pulses passed by said threshold circuit, for reversing the sense of such pulses to form inverted pulses; means for combining said inverted pulses and pulses from said differentiator circuit which are below said predetermined amplitude to form a pulse train; and a two-way digital register connected to receive said pulse train to register pulses of one sense as increments and pulses of the other sense as decrements.

References Cited in the file of this patent

UNITED STATES PATENTS

| | | |
|---|---|---|
| 2,046,846 | Ramelet | July 7, 1936 |
| 2,177,799 | Bloch | Oct. 31, 1939 |
| 2,619,570 | Takats | Nov. 25, 1952 |
| 2,632,830 | Aust | Mar. 24, 1953 |
| 2,733,430 | Steele | Jan. 31, 1956 |
| 2,932,020 | Sproul | Apr. 5, 1960 |